United States Patent
Keller

(10) Patent No.: US 9,786,258 B2
(45) Date of Patent: Oct. 10, 2017

(54) APPARATUS INCLUDING AN INSTRUMENT HOLDER

(71) Applicant: John Keller, Austin, TX (US)

(72) Inventor: John Keller, Austin, TX (US)

(*) Notice: Subject to any disclaimer, the term of this patent is extended or adjusted under 35 U.S.C. 154(b) by 0 days.

(21) Appl. No.: 14/709,337

(22) Filed: May 11, 2015

(65) Prior Publication Data
US 2016/0335993 A1    Nov. 17, 2016

(51) Int. Cl.
| | |
|---|---|
| *G10G 5/00* | (2006.01) |
| *F16M 13/02* | (2006.01) |
| *A47G 25/28* | (2006.01) |
| *A47B 81/00* | (2006.01) |
| *G10D 1/08* | (2006.01) |

(52) U.S. Cl.
CPC ............... *G10G 5/00* (2013.01); *A47G 25/28* (2013.01); *F16M 13/02* (2013.01); *A47B 81/005* (2013.01); *G10D 1/08* (2013.01)

(58) Field of Classification Search
CPC G10G 5/00; G10G 5/005; G10G 7/00; G10G 7/005; G10G 7/02; G10D 13/026; G10D 1/085; G10D 3/00; G10D 13/06; G10D 1/08; G10D 3/18; G10D 13/00; G10D 3/003; G10D 3/163; G10D 13/065; G10D 3/02
USPC ................... 248/304, 305, 339, 340; 84/327
See application file for complete search history.

(56) References Cited

U.S. PATENT DOCUMENTS

| | | | | |
|---|---|---|---|---|
| 4,019,632 | A * | 4/1977 | Greenlee | B65D 73/0064 206/349 |
| 4,346,825 | A * | 8/1982 | Leger | A47G 25/28 211/113 |
| D279,627 | S * | 7/1985 | Morin | D6/315 |
| 4,966,287 | A * | 10/1990 | Snyder | A45C 11/16 211/113 |
| 5,484,056 | A * | 1/1996 | Wood | B65D 73/0064 206/349 |
| 5,857,597 | A * | 1/1999 | Kolton | A47G 25/743 150/131 |
| 6,398,086 | B1 * | 6/2002 | Bennett | A47F 7/12 211/113 |
| 7,464,910 | B1 * | 12/2008 | St. Germain | G10G 5/00 211/85.6 |
| 7,775,491 | B1 * | 8/2010 | Samu | G10G 5/00 248/215 |
| D624,808 | S * | 10/2010 | Krawczak | D8/373 |
| 8,157,224 | B2 * | 4/2012 | Turvey | B65D 33/14 223/91 |
| 8,186,509 | B2 * | 5/2012 | Samelson | A47F 5/0006 206/326 |
| 9,345,322 | B1 * | 5/2016 | Starnes | F41C 27/00 |
| 2008/0210827 | A1 * | 9/2008 | Samelson | A47F 5/0823 248/56 |

* cited by examiner

*Primary Examiner* — Steven Marsh
(74) *Attorney, Agent, or Firm* — Cesari & Reed LLP; R. Michael Reed

(57) ABSTRACT

In some embodiments, an apparatus may include a hanging element and a frame coupled to the hanging element. The frame may include a shoulder portion and a load-bearing crossbeam coupled to the shoulder portion. The load-bearing crossbeam may include a collar at a center of the load-bearing crossbeam. The collar may be sized to releasably secure a portion of an instrument. In some embodiments, the instrument may be a musical instrument, a tool, or a firearm.

18 Claims, 9 Drawing Sheets

APPARATUS INCLUDING AN INSTRUMENT HOLDER

FIELD

The present disclosure is generally related to an apparatus including an instrument holder, and more particularly to an instrument holder device configured to secure and optionally disguise an instrument.

BACKGROUND

Instrument storage can present a challenge to professional and amateur musicians. For example, instruments may be kept in their own dedicated cases to protect the instrument, but such dedicated cases may be rigid and may present a problem for storage.

SUMMARY

In some embodiments, an apparatus may include a hanging element and a frame coupled to the hanging element. The frame may include a shoulder portion and a load-bearing crossbeam coupled to the shoulder portion. The load-bearing crossbeam may include a collar at a center of the load-bearing crossbeam. The collar may be sized to releasably secure a portion of an instrument.

In other embodiments, an apparatus may include a hook and a frame including a shoulder portion and an instrument holder. The shoulder portion may include an upper portion coupled to the hook and may include a lower portion. The instrument holder may be coupled to the lower portion and may include a collar configured to releasably secure a portion of an instrument.

In still other embodiments, an apparatus may include an instrument hanger having a hook sized to fit over a closet rod and a frame coupled to the hook. The frame may include a shoulder portion coupled to the hook and an instrument holder coupled to the shoulder portion. The instrument holder may include a collar configured to releasably secure an instrument.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of apparatuses and methods are described below that may be used to secure an instrument in a hanging position. In some embodiments, an apparatus may include an instrument holder device including a frame and a hanging element (such as a hook) configured to hang the frame from a hook or a rod. In some embodiments, the frame may include a shoulder portion, arms extending substantially vertically from the shoulder portion, and a support element extending substantially horizontally between the arms. In some embodiments, the support element may be a load-bearing crossbeam configured to secure and support an instrument. The support element may include a holding feature, such as a cup, a groove, or another recessed feature, or a clip or other feature extending from the frame, sized to receive at least a portion of an instrument. In some embodiments, the apparatus may include a strap or securing apparatus extend over a portion of the instrument to hold the instrument within the holding feature.

In some embodiments, the instrument may be a musical instrument, such as a guitar, a violin, a bass, a trumpet, a clarinet, or another instrument. In some embodiments, the instrument may be another apparatus, such as a tool, a firearm, or another device.

In some embodiments, the support element may be interchanged with another support element having different holding features. Further, in some embodiments, arm extensions may be attached between the arms of the frame and the support element to extend an opening for receiving the instrument. In some embodiments, the arm extension may also widen the opening, allowing the apparatus to be adapted for use with different types of instruments, different sizes of instruments, or any combination thereof. In some embodiments, the holding feature may be centered between the arms to balance a weight distribution relative to a center of mass between the arms. In some embodiments, the support element may include multiple holding elements, which may be distributed substantially evenly across the support element, on either side of the support element, or any combination thereof. Other embodiments are also possible.

In some embodiments, the apparatus may provide a disguise option configured to disguise or otherwise hide the instrument in plain sight. In an example, the apparatus may include a garment bag or other cover that may be extended over the shoulder portion of the frame and around the instrument to disguise the instrument as a suit or other garment. The garment bag may provide protection from theft by disguising the instrument as a garment, which may be less likely to attract the attention of a thief. One possible example of an apparatus to hold an instrument is described below with respect to FIG. 1.

Figure 1:
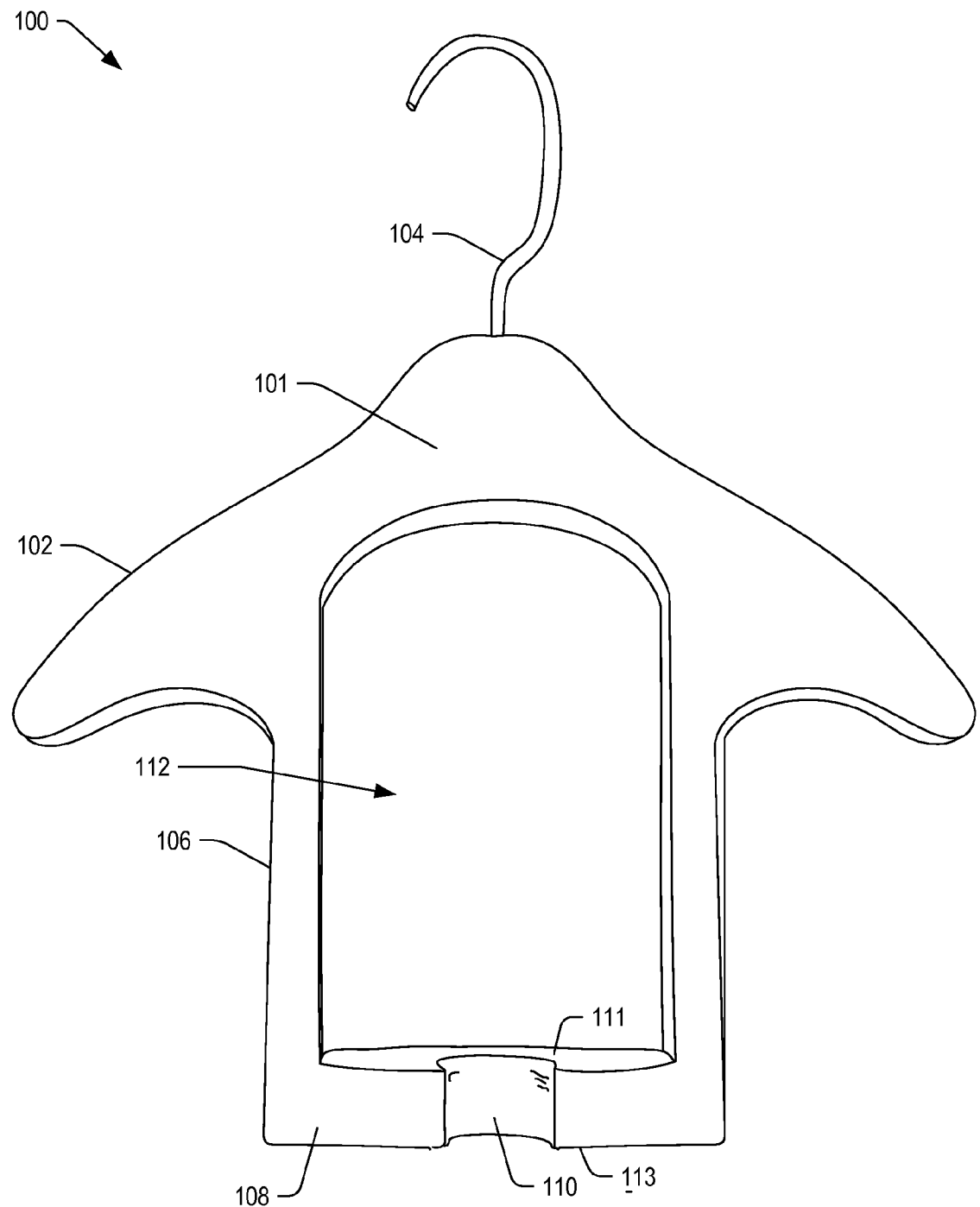
FIG. 1 is a front view of an apparatus including an instrument holder, in accordance with some embodiments of the present disclosure.

FIG. 1 is a front view of an apparatus 100 including an instrument holder, in accordance with some embodiments of the present disclosure. The apparatus 100 may include a frame 101, which may be formed from wood, metal, or another rigid material with sufficient rigidity and strength to support and hold an instrument. In some embodiments, the apparatus 100 may support an instrument weighing up to thirty pounds, for example.

The frame 101 may include a shoulder portion 102 and may be coupled to a hanging portion 104. In some embodiments, the hanging portion 104 may include a hook for securing the frame 101 in a hanging position on a hanger element, such as a hook or a clothing rod. In the illustrated example, the hanging portion 104 may be formed from a metal rod bent in the shape of a hook. In a particular embodiment, the hanging portion may be made of metal of approximately one quarter of an inch diameter. A hole may be drilled into a center of a top portion of the frame 101, and the hanging portion 104 may be screwed into the hole to attach the hanging portion 104 to the frame 101.

The frame 101 may include one or more arms 106 that may extend substantially vertically from the shoulder portion 102 and may include an instrument holder 108 coupled to the one or more arms 106. The instrument holder 108 may extend substantially horizontally (parallel to the ground) between the one or more arms 106 and may include at least one holding element (or collar) 110 configured to hold the instrument. The shoulder portion 102, the one or more arms 106, and the instrument holder 108 may define an opening 112 sized to receive a portion of the instrument, such as the head portion of a guitar, a peg box portion of a violin, or a bell portion of a trumpet. Further the instrument holder 108 may include a collar 110 formed on or partially within the instrument holder 108.

An instrument may be inserted within the collar 110, which may be configured to secure the instrument. In some embodiments, the collar 110 may have a curved surface, which may optionally be lined by fabric, plastic, foam, or another material configured to cushion the instrument within the collar 110.

In some embodiment, the collar 110 may be substantially cylindrical and may be carved out from the instrument holder 108. In some embodiments, the collar 110 may have a substantially conical shape for at least a first portion extending from a top surface 111 of the instrument holder 108 and narrowing or tapering as the collar 110 extends toward a lower surface 113 of the instrument holder 108. In some embodiments, additional features may be formed on or included with the instrument holder 108 to secure an object or instrument within the collar 110. One possible embodiment having a lip or a ridge formed on the top surface 111 to hold the instrument or object in the instrument holder 110 is described below with respect to FIGS. 2A-2C.

Figure 2A:
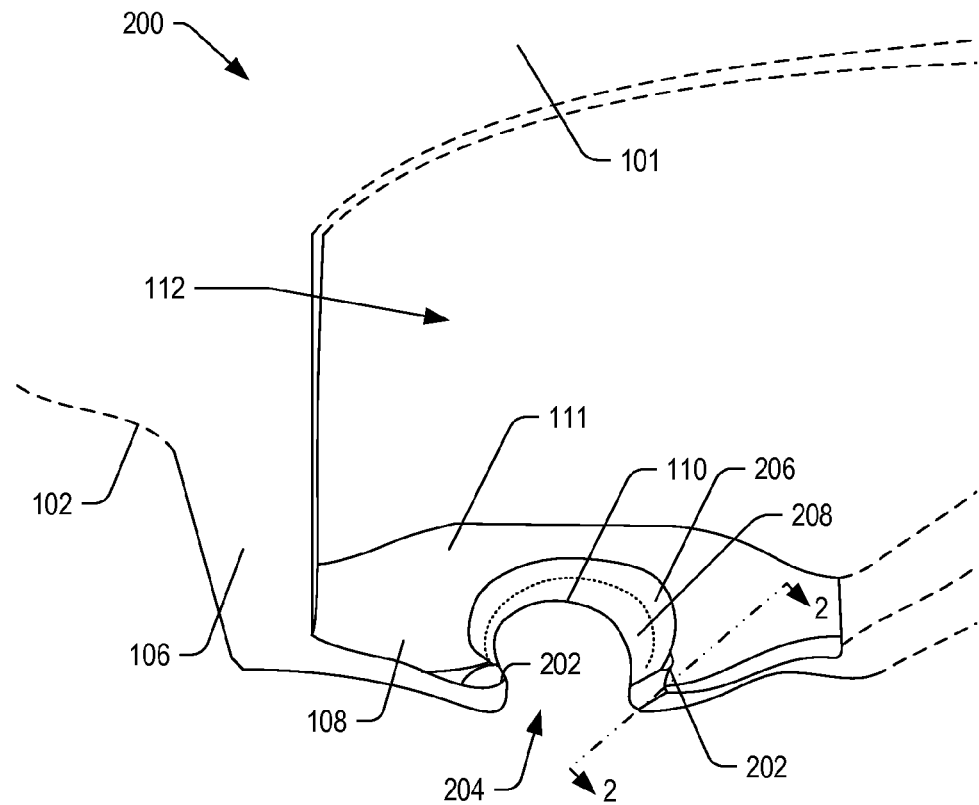
FIG. 2A is top view of a portion of the apparatus of FIG. 1, including a lip or ridge at a circumferential edge of a holder portion, in accordance with certain embodiments of the present disclosure.

FIG. 2A is top view of a portion 200 of the apparatus 100 of FIG. 1, including a lip 202 or ridge at a circumferential edge of a collar 110, in accordance with certain embodiments of the present disclosure. The lip or ridge 202 may be formed at the edge of an opening 204 defined in the collar 110, and the collar 110 may have a substantially conical shape that narrows as the collar 110 extends away from the top surface 111.

In some embodiments, the collar 110 may define a first slope extending from the top surface and may define a second slope extending from an area having the first slope to the bottom surface 113 (in FIG. 1). In some embodiments, the collar 110 may have a first portion 206 having a first slope and a second portion 208 having a second slope. In some embodiments, the first slope 206 may define an angle relative to the top surface 111 that is less than 90 degrees, and the second slope 206 may be greater than the first slope. In some embodiments, the first portion 206 may define a substantially conical shape and the second portion 208 may define a substantially cylindrical shape. In some embodiments, the first portion 206 and the second portion 208 may have substantially the same shape, but with differing slopes. Other shapes and slopes are also possible.

Figure 2B:
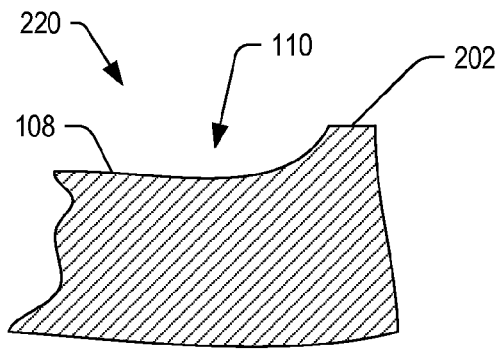
FIG. 2B is a side cross-sectional view taken along line 2-2 in FIG. 2A showing a substantially rectangular-shaped lip or ridge, in accordance with certain embodiments of the present disclosure.

FIG. 2B is a side cross-sectional view 220 taken along line 2-2 in FIG. 2A showing a substantially rectangular-shaped lip or ridge 202, in accordance with certain embodiments of the present disclosure. The lip or ridge 202 may be proximate to the opening. In this embodiment, the lip or ridge 202 may be formed by carving away material from the surface 111 and leaving a portion. In some embodiments, the lip or ridge 202 may be formed by attaching additional material to the surface 111 adjacent to the opening 204.

The conical slope of the collar 110 coupled with the lip or ridge 202 may secure an object or instrument within the collar 110. In particular, gravity may apply force to the object or instrument to push the instrument into the collar 110, and the lip or ridge 202 may prevent the instrument from falling out via the opening 204.

In some embodiments, the instrument holder 108 and the lip or ridge 202 may be integrally formed from a unitary piece of material, such as wood, plastic, metal, or a composite material. In some embodiments, the instrument holder 108 and the lip or ridge 202 may be formed from separate pieces and may be attached by a glue, a fastener, a weld, another fastening material, or any combination thereof. The separate pieces may be formed from the same materials or from different types of materials. While the embodiment of the lip or ridge 202 depicted in FIG. 2B includes a substantially planar top portion resembling part of a rectangle, other shapes are also possible. One possible embodiment including a lip or a ridge 202 having a curved tip is described below with respect to FIG. 2C.

Figure 2C:
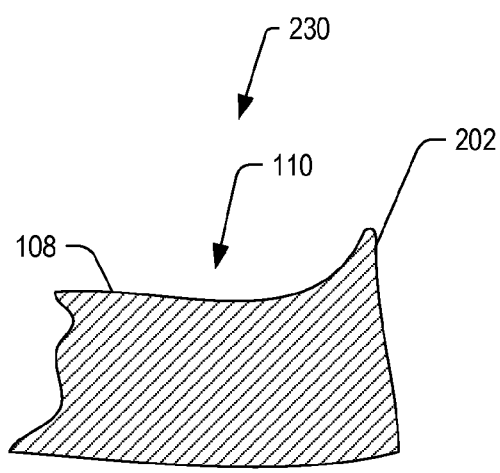
FIG. 2C is a side-cross-sectional view taken along line 2-2 in FIG. 2A showing a substantially pointed lip or ridge, in accordance with certain embodiments of the present disclosure.

FIG. 2C is a side-cross-sectional view 230 taken along line 2-2 in FIG. 2A showing a substantially pointed lip or ridge 202, in accordance with certain embodiments of the present disclosure. The lip or ridge 202 may be at least partially curved so that the lip or ridge 202 will not scratch or otherwise damage an instrument, an object, a person, or any combination thereof. In some embodiments, the lip or ridge 202 may be formed by carving away material from the instrument holder 108. In some embodiments, the lip or ridge 202 may be formed separately from the collar 110 and may be attached (glued, fastened, or otherwise coupled) to the collar 110 in order to provide a securing mechanism for the instrument or object.

In some embodiments, the lip or ridge 202 may be formed as part of the holding element 110, which may also have a first portion having a substantially conical shape and a second portion having a substantially cylindrical shape. In some embodiments, both the first portion and the second portion may be substantially conically shaped, but the portions may have different slopes such that the second portion may have a slope that is closer to perpendicular or normal relative to the top surface 110 as compared to the slope of the first portion.

In some embodiments, the apparatus 100 in FIGS. 1 and 2 may be used to hold an instrument weighing up to approximately thirty pounds. Further, in some embodiments, the instrument may be a musical instrument, such as a guitar, a violin, a bass, a trumpet, a clarinet, or another instrument. In some embodiments, the instrument may be another apparatus, such as a tool, a firearm, or another device. One possible embodiment of the apparatus 100 including a strap configured to secure the instrument in the collar 110 is described below with respect to FIG. 3.

Figure 3:
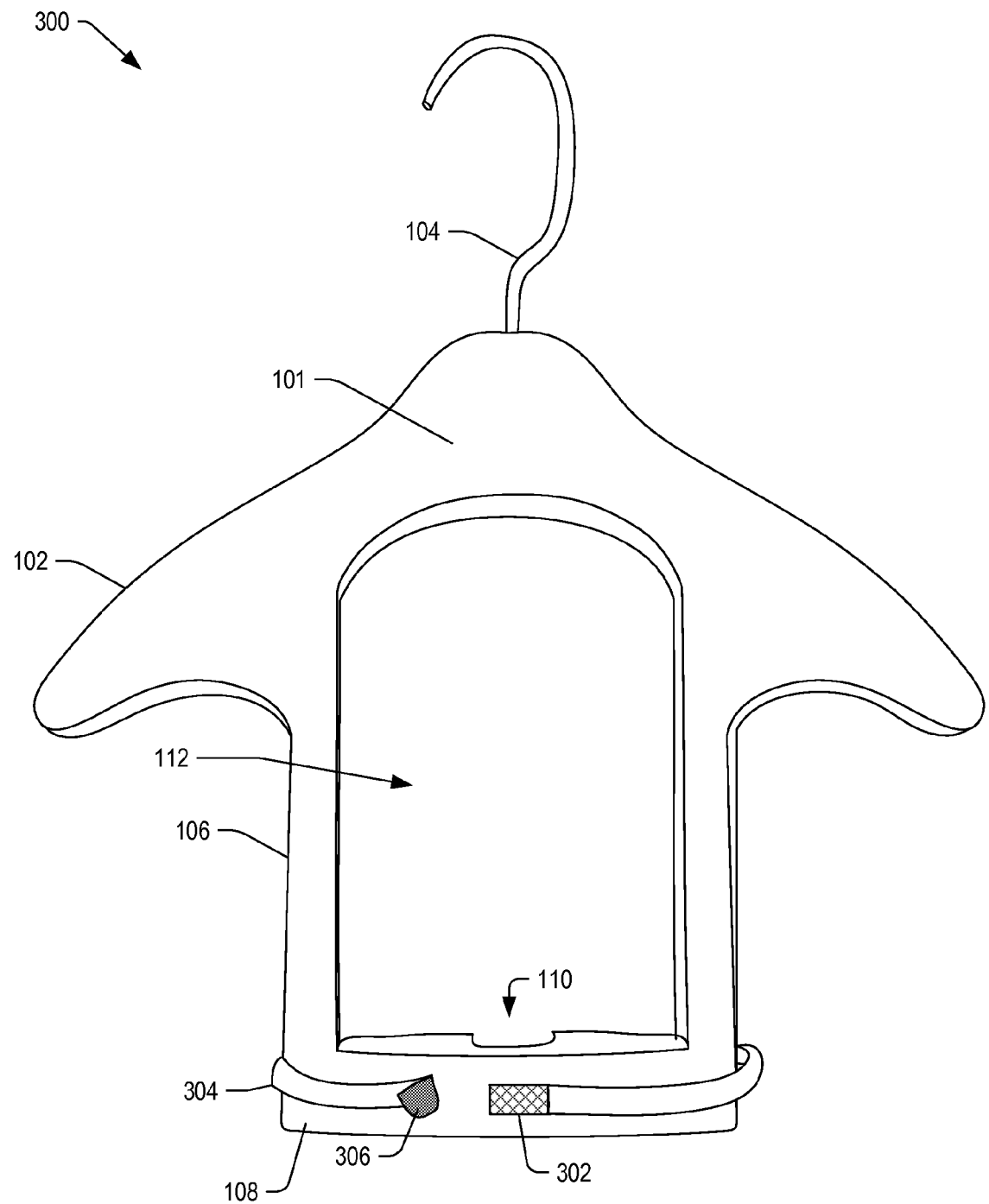
FIG. 3 is a rear view of an apparatus including an instrument holder, in accordance with some embodiments of the present disclosure.

FIG. 3 is a rear view 300 of the apparatus 100 of FIG. 1 including the instrument holder 108, in accordance with some embodiments of the present disclosure. The apparatus 100 may include a strap 304 including a first end including an attachment element 302 coupled to the frame 101 and a second end including a fastener element 306. The strap 304 may extend about the frame 101 (over at least a portion of the instrument holder) and the fastener element 306 may couple to the attachment element to secure an instrument within the collar 110. In some embodiments, the attachment element 302 may be coupled to the instrument holder 108 using glue, a fastener (such as a screw or a nail), or some other attachment mechanism. In some embodiments, the attachment element 302 and the fastener element 306 may be formed from hook and eye material, respectively (or vice versa), allowing the fastener element 306 to releasably attach to the attachment element 302.

In some embodiments, a user may place the neck of an instrument (such as a guitar) into the collar 110 and may wrap the strap 304 around the instrument holder 108, attaching the fastener element 306 to the attachment element 302 to hold the guitar within the collar 110. In some embodiments, the strap 304 may be replaced with another fastening element, such as a hinged structure, an elastic band, or another fastening element.

The apparatus 100 in FIG. 1, the apparatus 200 in FIG. 2, and the apparatus 300 in FIG. 3 may be configured to secure and store a variety of instruments or devices. The apparatus 100, 200 or 300 may hang in a closet or on a hook, securing and hanging the instrument as well. One possible example of an apparatus 100, 200, or 300 configured to hold a guitar is described below with respect to FIG. 4.

Figure 4:
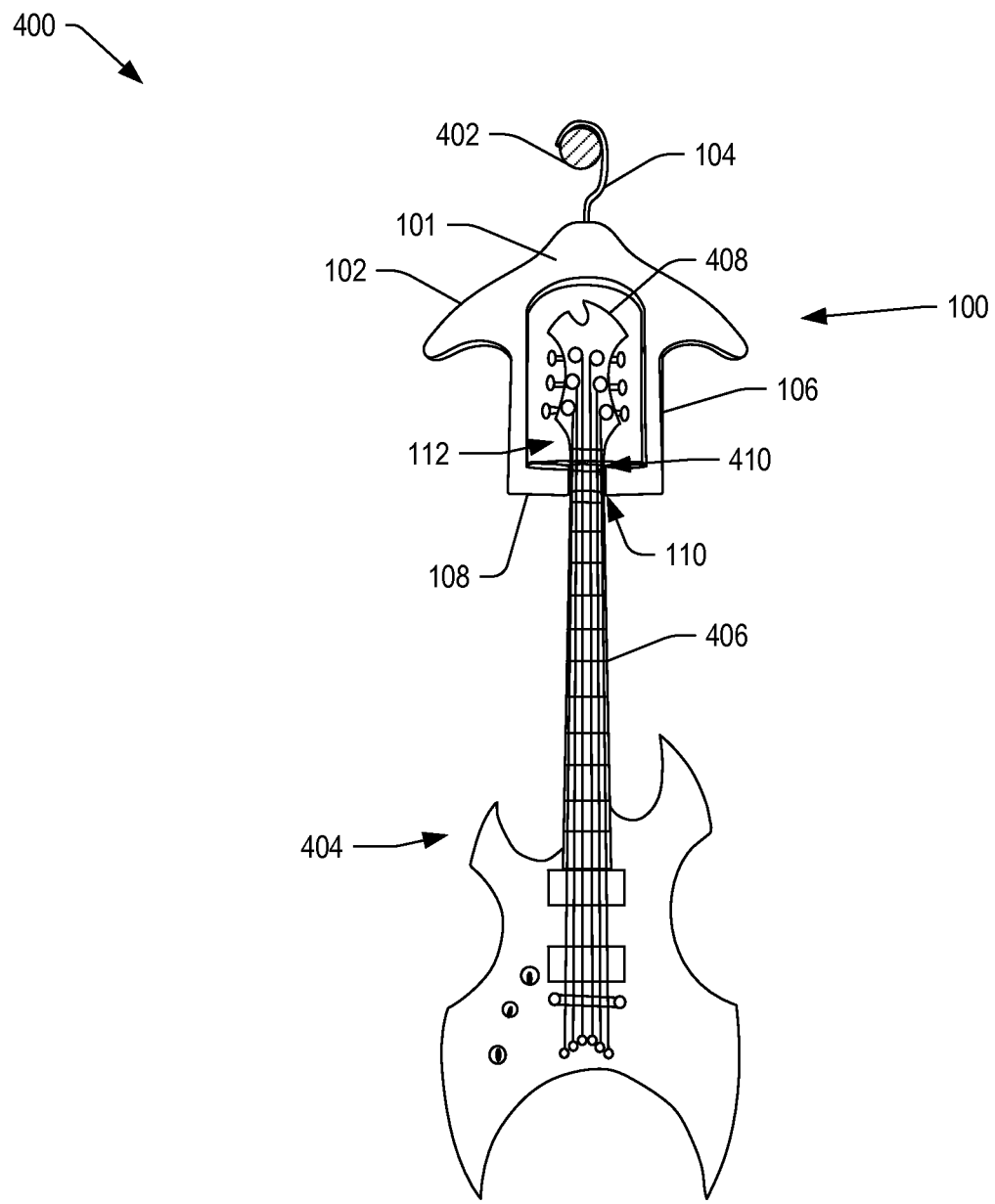
FIG. 4 is a front view of an apparatus including an instrument holder, in accordance with some embodiments of the present disclosure.

FIG. 4 is a front view of an apparatus 400 including an instrument holder 108 configured to hold a guitar 404, in accordance with some embodiments of the present disclosure. The apparatus 400 includes the hanging portion 104 configured to fit over a closet rod 402 (shown in cross-section). The guitar 404 includes a neck portion 406 and a head portion 408 coupled to one another via a nut 410. The neck portion 406 may fit within the collar 110, and the nut 410 and the head portion 408 may rest on the instrument holder 108. In some embodiments, the strap 204 may extend around the instrument holder 108 to secure the neck portion 406 within the collar 110.

In the illustrated configuration, the guitar 404 may be hung on a closet rod 402 via the apparatus 400, which may be stored in a closet, out of sight and off of the floor. Further, unless the closet rod 402 falls, the guitar 404 may be protected from falling over or from being knocked over. In addition to securing an instrument for safe storage, the apparatus 100, 200, 300, and 400 in FIGS. 1-4 may also include a cover, such as a garment bag or holder, configured to fit over the shoulder portion 102 to hide or disguise the instrument. In some embodiments, the bag or holder may be configured to disguise the instrument as a garment (such as a suit, a dress or a coat) or as another item, which may be less desirable to a thief than the instrument. One possible example of an apparatus including a cover, such as a garment bag, is described below with respect to FIG. 5.

Figure 5:
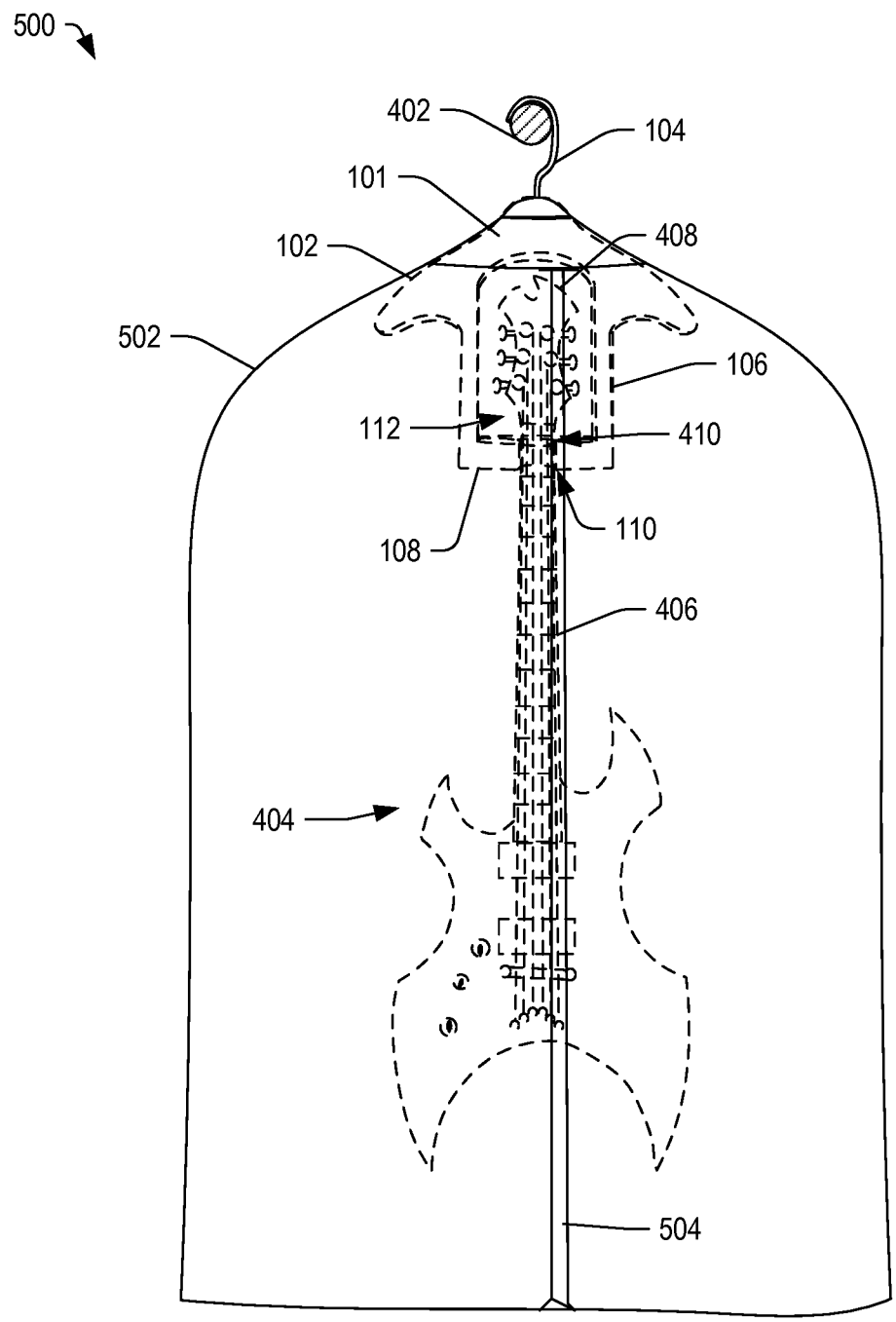
FIG. 5 is a front view of an apparatus including an instrument holder, in accordance with some embodiments of the present disclosure.

FIG. 5 is a front view of an apparatus 500 including an instrument holder device 108 disguised by a cover 502, in accordance with some embodiments of the present disclosure. The apparatus 500 may include all of the elements described above with respect to the apparatuses of FIGS. 1-4. Further, the apparatus 500 may include a cover 502 including a zipper 504. The cover 502 may have a shape similar to a standard garment bag and may be configured to fit over the hanging portion 104 and to rest on the shoulder portion 102 of the frame 101. The cover 502 may drape over and cover the guitar 404, disguising the guitar as a suit or other garment stored in the closet. In some embodiments, the cover 502 may provide protection from theft by disguising the guitar 404 in plain sight, providing protection without detection.

In some embodiments, instruments other than musical instruments may be disguised by the cover 502. Further, the apparatus 500 may be configured to secure other types of devices, such as tools, guns, or other devices. One possible example of the apparatus configured to hold a rifle is described below with respect to FIG. 6.

Figure 6:
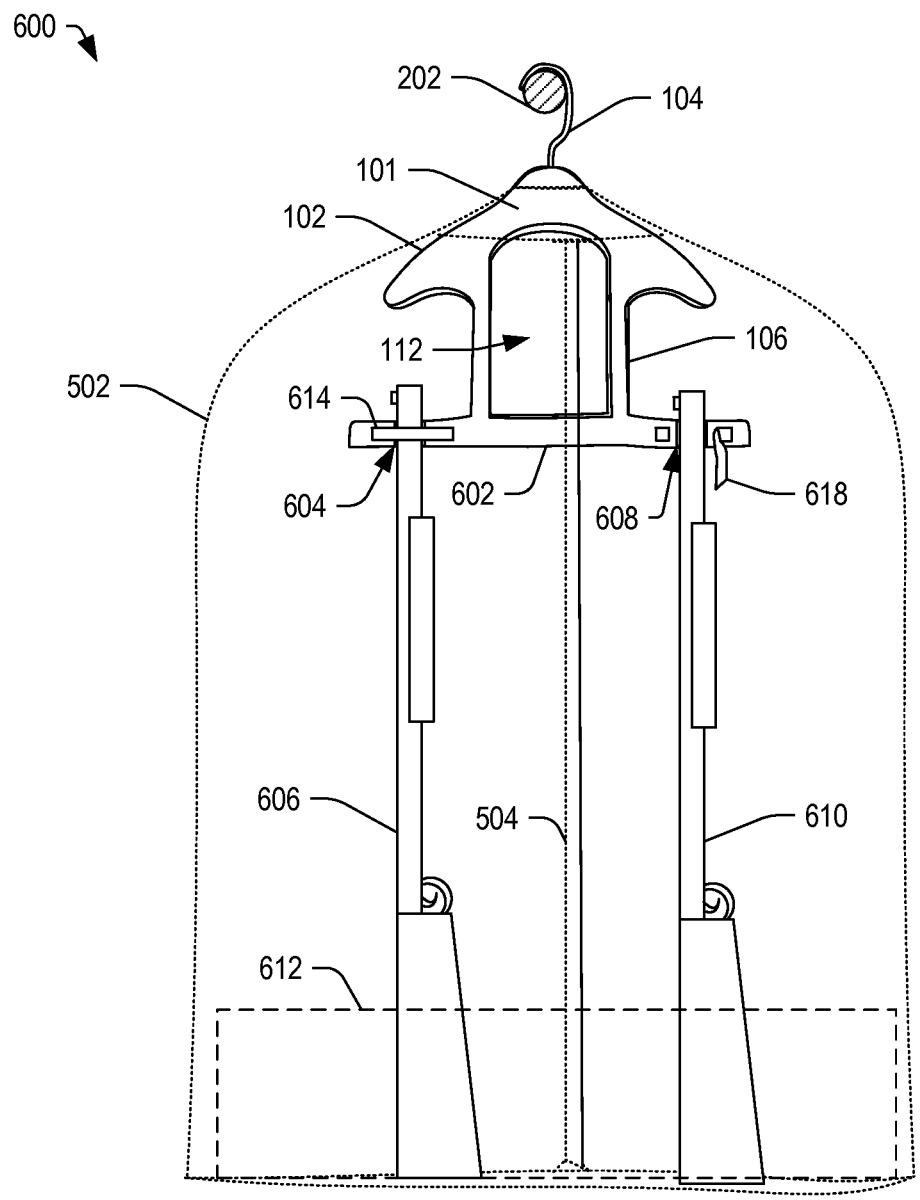
FIG. 6 is a diagram of an apparatus including an instrument holder, in accordance with some embodiments of the present disclosure.

FIG. 6 is a diagram of an apparatus 600, in accordance with some embodiments of the present disclosure. The apparatus 600 includes a frame 101 including a shoulder portion 102 coupled to a hanging portion 104 configured to secure the apparatus 600 to a hook or a closet rod 402. The apparatus 100 further includes arms 106 extending from the shoulder portion 102 and coupled to an instrument holder 602 configured to hold two rifles 606 and 610. The instrument holder 602 includes a first collar 604 to hold the muzzle of the rifle 606 and may include a first strap 614 configured to secure the muzzle in the collar 604. The support element 602 may include a second collar 608 configured to hold the muzzle of the rifle 610 and may include a second strap 618 configured to secure the muzzle in the collar 608. In some embodiments, the collars 604 and 608 may be cups, carved out features, clips, or other elements configured to receive the muzzle of the rifles 606 and 610, respectively.

In some embodiments, the apparatus 600 may also include a stock collar 612, which may be made of foam or of another material and which may be configured to fit the end of the stock of each of the rifles 606 and 610 to hold them in a particular orientation so that the rifles 606 and 610 do not turn or tip within the cover 502.

In some embodiments, a user may insert the stock of the rifle 606 into a receptacle of the stock collar 612 at a bottom portion of the cover 502 and position the muzzle in the collar 604. Then, the user may secure the muzzle in the collar 604 via the strap 614. In some embodiments, the user may execute a similar method to install the second rifle 610 via collar 608 and strap 618.

In some embodiments, the stock collar 612 may be a separate component that may be added to the bottom portion of the cover 502. In an embodiment, the stock collar 612 may be formed from open-cell foam, cardboard, another material, or any combination thereof. In some embodiments, the cover 502 may be standard garment bag, which may be adapted for use with different instruments. In some embodiments, the instrument holder 602 may be a modular component that may be coupled to the frame 101, and the instrument holder 602 may be selected from a plurality of instrument holders having support elements with other configurations for storage of different instruments. One possible example of such a modular system is described below with respect to FIGS. 7A-7E.

Figure 7A:
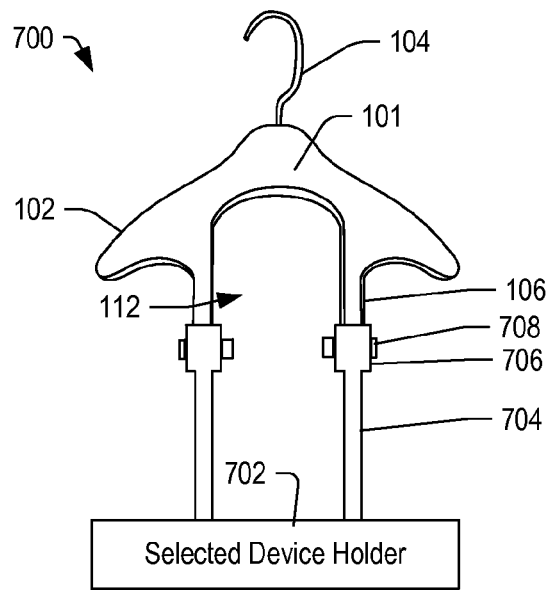
FIGS. 7A-7E are diagrams of an apparatus including an instrument holder including multiple detachable support elements, in accordance with some embodiments of the present disclosure.

FIGS. 7A-7E are diagrams of an apparatus, which may be configured to provide a selected instrument holder device, in accordance with some embodiments of the present disclosure. In FIG. 7A, an apparatus 700 including an instrument holder device 700 is shown, which may include a hanging portion 104 and a shoulder portion 102. The shoulder portion 102 may include legs 106 extending substantially vertically and in plane with the shoulder portion 102. The legs 106 may be provided with an attachment portion, such as a bolt hole or other attachment mechanism, configured to couple to a selected device holder, to leg extensions, or any combination thereof to facilitate storage of a selected instrument. In an example involving a musical instrument, a tuba or French horn may require a wider opening 112 than a guitar, and the leg extensions may extend the opening 112. In some embodiments, the frame 101 may be formed with a larger shoulder portion 102 and may provide arms 106 having different widths for different instruments.

In the illustrated example, the arms 106 may include a bolt hole sized to receive a bolt 708 to secure an attachment element 706 of an arm extension 704 to the arms 106. Further, the arm extensions 704 may be coupled to a selected instrument holder 702. The selected instrument holder may be selected from a plurality of instrument holders having different shapes and sizes, having different collars, having other features, or any combination thereof. One possible example of an instrument holder is described below with respect to FIG. 7B.

Figure 7B:
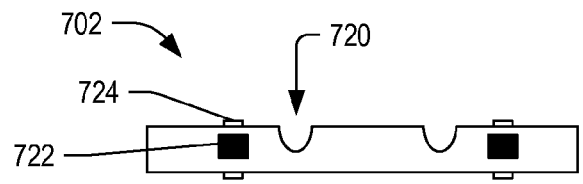

FIG. 7B is a diagram of an instrument holder 702 including openings 722 sized to receive a distal end of the arm extensions 704 in FIG. 7A, and including a bolt opening sized to receive a bolt 724 to secure the instrument holder to the arm extensions 704. The instrument holder 702 may include one or more collars 720 sized to receive an instrument.

Figure 7C:
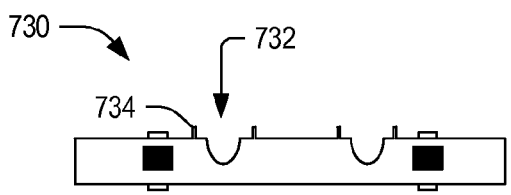

FIG. 7C is a diagram of an instrument holder 730, which may include openings 722 and bolts 724. The instrument holder 730 may also include pegs 724 on either side of holder elements 720, which may be used to secure a strap, such as an elastic band or other strap to the device holder 730 to secure an instrument within the collar 732. In an alternative example, instead of a flexible strap or band, the pegs 724 may be used to secure the attachment mechanism to the instrument holder 730. In an example, a strap, band, or device may couple to one of the pegs 724 and, after an instrument is inserted in the adjacent collar 734, may be coupled to another of the pegs 724 to hold the instrument in the collar 734.

Figure 7D:
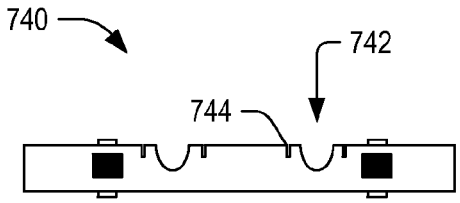

FIG. 7D is a diagram of an instrument holder 740, which may include openings 722 and bolts 724. Further, the instrument holder 740 may include a collar 742 and may include grooves 744, which may be used to secure an attachment mechanism, such as a strap or band, to the device holder 740. In an example, strap or band may be inserted into the grooves (notches or openings) 744, may be stretched around collar 742, and attached to the groove 744 on the opposing side of the collar 742 to secure an instrument in the collar 742.

Figure 7E:
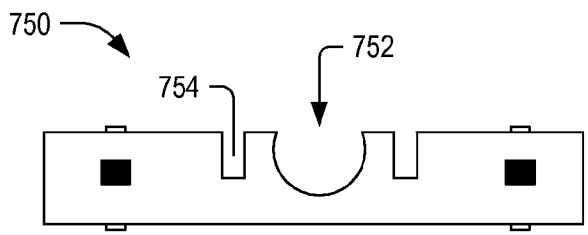

FIG. 7E is a diagram of an instrument holder 750, which may include openings (grooves or notches) 754 on either side of a collar 752. The openings 754 may be configured to receive a strap, an elastic band, or another holding mechanism, which may be extended over an instrument positioned within the collar to secure the instrument to the instrument holder 750.

In some embodiments, the openings 754 may be sized to receive snap structures associated with a substantially rigid mechanism, which may be placed over the collar 752 and snapped into the openings 754 to secure the instrument. Other embodiments are also possible.

In the above embodiments, the collar has been shown to be a depression or carved out feature extending into the instrument holder 108 or the device holder. The collar is a holding element configured to hold an object. Further, in the above-examples, when more than one holding element has been shown on the device holder, the holding elements have been substantially equal in size. However, in some embodiments, the holding element may be an external feature mounted to the device holder. Additionally, in some embodiments, one or more of the holding elements on the device holder may have a different size relative to other holding elements. In some embodiments, the holding elements may be on both sides of the device holder (front and back, right side and left side, or any combination thereof). One possible example of a device holder including multiple holding elements including holding elements of at least two different sizes is described below with respect to FIG. 8A.

Figure 8A:
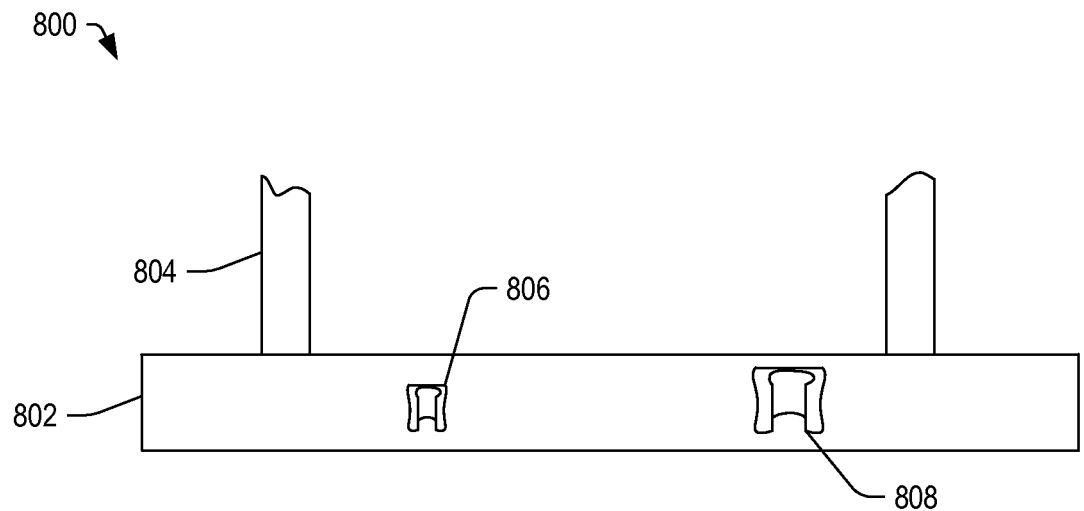
FIG. 8A is a diagram of a portion of an apparatus including an instrument holder having multiple holding elements extending from a surface of the support element, in accordance with some embodiments of the present disclosure.

FIG. 8A is a diagram of a portion 800 of an apparatus including an instrument holder 802 having multiple holding elements 806 and 808 extending from a surface of the instrument holder 802, in accordance with some embodiments of the present disclosure. The instrument holder 802 may be coupled to a shoulder portion 102 of the instrument holder device of FIGS. 1-7E, for example. The instrument holder 802 may include a first holding element 806 and a second holding element 808. The second holding element 808 may be larger than the first holding element 806. In some embodiments, the holding element 806 may be on a first side of the instrument holder 802, and the holding element 808 may be on a second side of the instrument holder 802.

In some embodiments, the holding elements 806 and 808 may form a clip configured to snap onto or over a portion of an instrument to be held. In some embodiments, other types of clips or holding elements may be included. In some embodiments, the holding elements 806 and 808 may be centered on the instrument holder 802 or may be distributed across the instrument holder 802. Further, while only two holding elements 806 and 808 are shown, the instrument holder 802 may include one or more holding elements.

Figure 8B:
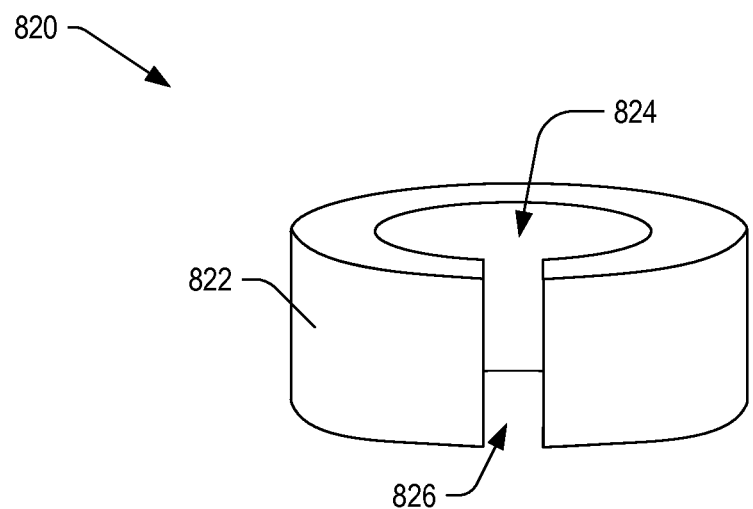
FIG. 8B is a diagram of an apparatus that may be used in conjunction with a holding element of an instrument holder, in accordance with certain embodiments of the present disclosure.

FIG. 8B is a diagram of an apparatus 820 that may be used in conjunction with a holding element 110 of an instrument holder 108, in accordance with certain embodiments of the present disclosure. In some embodiments, the holding element 110 of the instrument holder 108 of FIG. 1, for example, may be too large for a particular instrument, such as the instrument 404 in FIG. 4. The apparatus 820 may be used as an adapter sized to fit within the holding element 110 to adjust an internal diameter of the holding element 110 to improve the holding fit for the particular instrument.

In some embodiments, the apparatus 820 may be used as an alternative implementation of the holding elements 806 and 808 of FIG. 8A. In some embodiments, the apparatus 820 may be sized to fit within one of the holding elements 806 and 808 of FIG. 8A to adapt the selected holding element 806 or 808 to fit a particular sized instrument or object. Other implementations are also possible.

Figure 9:
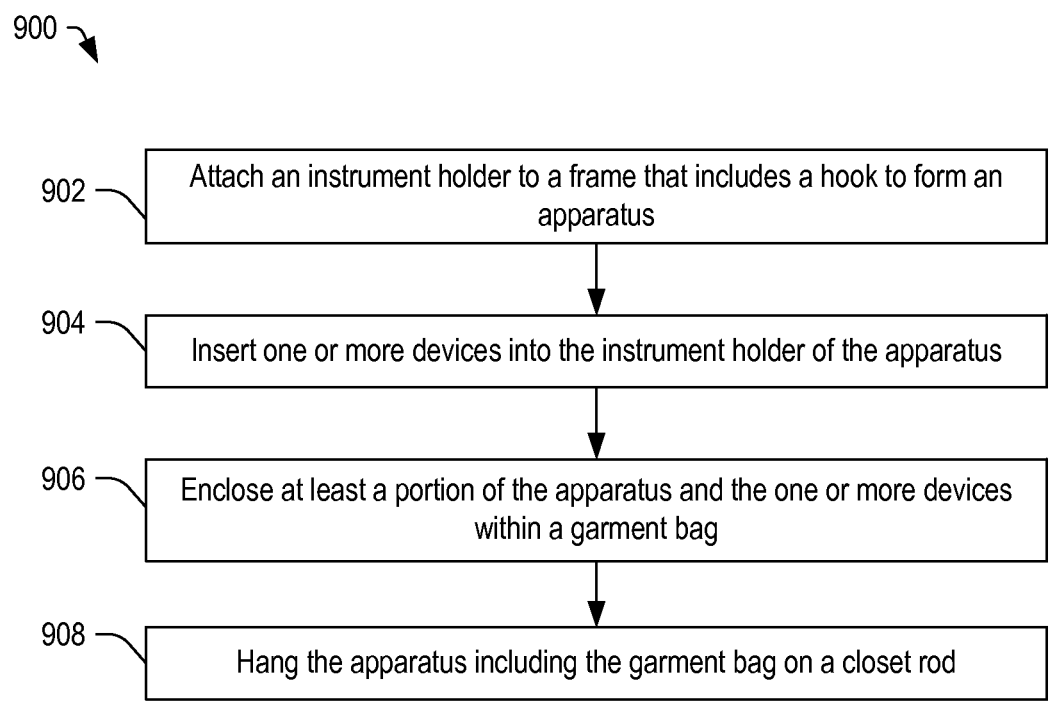
FIG. 9 is a flow diagram of a method of securing an instrument in an apparatus including an instrument holder, in accordance with some embodiments of the present disclosure.

FIG. 9 is a flow diagram of a method 900 of securing an instrument in an instrument holder, in accordance with some embodiments of the present disclosure. The method 900 may include attaching an instrument holder to a frame that includes a hook to form an apparatus. In some embodiments, the frame may include a shoulder portion and arms, and the instrument holder may be coupled to the arms to form the apparatus. Advancing to 904, the method 900 may include inserting one or more devices into the instrument holder of the apparatus. The one or more devices may include musical instruments, tools, or other devices. In some embodiments, inserting may further include extending a strap or other holding mechanism over the device within a holding element (such as an indentation, cut out, clip or other feature) of the instrument holder.

The method 900 may also include enclosing at least a portion of the apparatus and the one or more devices within a garment bag. The garment bag may fit over a hook portion of the apparatus and may hang on a shoulder portion, and the instrument or device may be attached to the holding element. The garment bag may be zipped or otherwise closed to disguise the one or more devices as a garment.

The method 900 may further include hanging the apparatus including the garment bag on a closet rod (or hook), at 908. By disguising the device as a garment, protection from theft may be provided through deception. Further, the garment bag may protect the device from dust and other airborne contaminants. Additionally, the apparatus allows the device to be hung up for storage purposes.

In conjunction with the apparatuses, methods and devices described above with respect to FIGS. 1-9, an apparatus is disclosed that may include a frame and an instrument holder configured to hold an instrument. The apparatus may include a hook or other hanging mechanism coupled to the frame to allow the apparatus to be hung on a hook or a closet rod. In some embodiments, the instrument holder may be configured to hold a musical instrument (such as a guitar, a horn, a violin, or another musical instrument) or to hold an instrument such as a gun, a tool, or another device. In some embodiments, the apparatus may hold multiple devices or instruments of the same or different sizes. Further, in some embodiments, the instrument holder of the apparatus may include cut out portions, clips, or some combination thereof, that can hold a portion of an instrument. In some embodiments, the apparatus may include a lip, ridge or other protrusion adjacent to an instrument holder to secure an instrument within the instrument holder. The apparatus may further include a strap that may be configured to secure the instrument to the instrument holder. In some embodiments, the apparatus may include a cover, such as a garment bag, which may fit over the frame and the instrument to disguise and protect the instrument.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a hanging element; and
   a frame coupled to the hanging element and including:
      a shoulder portion; and
      a load-bearing crossbeam coupled to the shoulder portion and including a collar at a center of the load-bearing crossbeam and further including one or more ridges proximate to the collar and configured to secure the portion of the instrument within the collar, the collar sized to releasably secure a portion of an instrument.

2. The apparatus of claim 1, wherein the instrument comprises at least one of a musical instrument and a firearm.

3. The apparatus of claim 1, further comprising a garment bag configured to fit over the shoulder portion of the frame to disguise the instrument as a garment.

4. The apparatus of claim 1, wherein the load-bearing crossbeam further includes at least one receptacle sized to receive one of a strap and an elastic band configurable to secure the instrument within the collar.

5. The apparatus of claim 1, wherein the frame further comprises:
   at least one member coupled to the shoulder portion at a first end and coupled to the load-bearing crossbeam at a second end and extending vertically therebetween; and
   wherein the at least one member defines a space between the shoulder portion and the load-bearing crossbeam to receive a portion of the instrument.

6. The apparatus of claim 1, wherein the collar includes a substantially curved interior surface formed within a portion of the load-bearing crossbeam.

7. The apparatus of claim 6, wherein the collar further includes a lining coupled to the substantially curved interior surface.

8. The apparatus of claim 1, wherein the shoulder portion and the load-bearing crossbeam are formed from a unitary piece of material.

9. The apparatus of claim 1, wherein the collar comprises:
   a first portion extending from a top surface of the load-bearing crossbeam and having a substantially conical shape; and
   a second portion extending from the first portion to a bottom surface of the load-bearing crossbeam.

10. The apparatus of claim 9, wherein the second portion has a substantially cylindrical shape.

11. An apparatus comprising:
   a hook sized to fit over a closet rod; and
   a frame including:
      a shoulder portion including an upper portion coupled to the hook and including a lower portion; and
      an instrument holder coupled to the lower portion, the instrument holder portion including a load-bearing structure coupled to the upper portion, the load-bearing structure including a collar at a horizontal center configured to releasably secure a portion of an instrument, the collar open along a lateral surface of the instrument holder, the load-bearing structure further including at least one receptacle sized to receive one of a strap and an elastic band configurable to secure the instrument within the collar.

12. The apparatus of claim 11, wherein the collar includes at least one ridge proximate to an instrument receiving opening, the at least one ridge configured to secure the instrument within the collar.

13. The apparatus of claim 11, wherein the instrument comprises at least one of a musical instrument, a tool, and a firearm.

14. The apparatus of claim 11, further comprising a garment bag configured to fit over the shoulder portion of the frame to disguise the instrument as a garment.

15. An apparatus comprising:
an instrument hanger including:
a hanging element sized to fit over a closet rod;
a frame coupled to the hanging element, the frame including a shoulder portion coupled to the hanging element and an instrument holder coupled to the shoulder portion, the instrument holder including a collar formed from a c-shaped recess that is open along a lateral side and configured to releasably secure an instrument; and
a garment bag sized to fit over the shoulder-shaped frame and the instrument to disguise the instrument as a garment.

16. The apparatus of claim 15, wherein the instrument holder comprises:
a vertical portion coupled to the shoulder portion; and
a load-bearing crossbeam coupled to the vertical portion, the load-bearing crossbeam including a collar sized to receive a portion of the instrument.

17. The apparatus of claim 16, wherein the load-bearing crossbeam further includes at least one receptacle sized to receive one of a strap and an elastic band configurable to secure the instrument within the collar.

18. The apparatus of claim 15, wherein the shoulder portion comprises at least one arm configured to support a shirt or jacket.

* * * * *